(No Model.)

W. BAYLEY.
Draft Equalizer.

No. 234,702.  Patented Nov. 23, 1880.

Attest
A. B. Smith
Aug. Jordan

Inventor
William Bayley
By his atty
R. D. Smith

UNITED STATES PATENT OFFICE.

WILLIAM BAYLEY, OF SPRINGFIELD, OHIO, ASSIGNOR TO WHITELEY, FASSLER & KELLY, OF SAME PLACE.

DRAFT-EQUALIZER.

SPECIFICATION forming part of Letters Patent No. 234,702, dated November 23, 1880.

Application filed October 5, 1880. (No model.)

*To all whom it may concern:*

Be it known that I, WILLIAM BAYLEY, of Springfield, in the county of Clarke and State of Ohio, have invented a new and useful Improvement in Draft Devices for Harvesters; and I do hereby declare that the following is a full and exact description of the same, reference being had to the accompanying drawings, forming a part of this specification.

My invention relates to draft devices where three horses are employed to operate a harvesting-machine or other implement, and where, in consequence thereof, it is desirable to have the horses located and attached to the machine one on the one side of the tongue or pole and two on the other, making it necessary to properly equalize and distribute their united power in even proportions of applied strain; and my invention consists in a combination of parts which I specifically describe and claim hereinafter.

Figure 1:
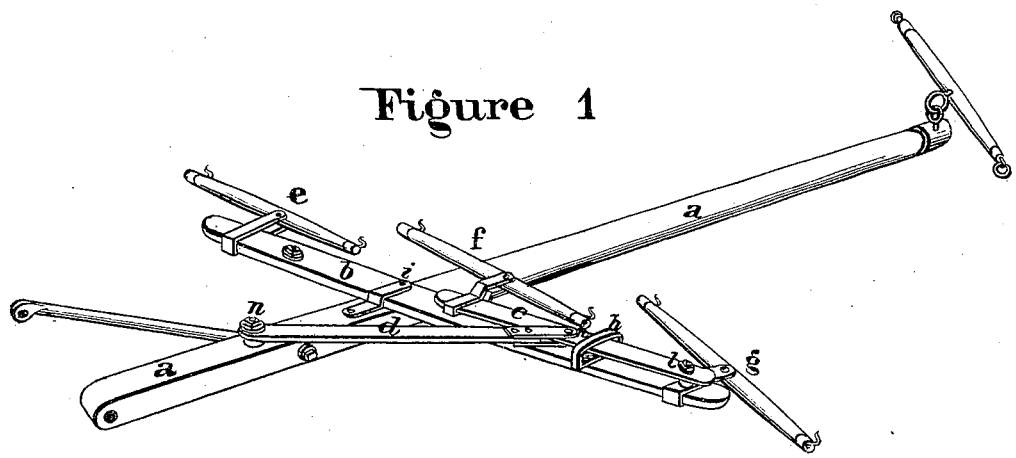
Figure 2:
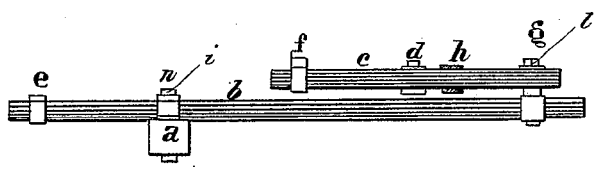

In the accompanying drawings, Figure 1 is a perspective view of my equalizing draft device, represented as attached to and forming a part of the tongue or pole, and Fig. 2 is a transverse elevation of the same.

It will be observed, reference being had to the accompanying drawings, that $a$ is the customary pole; $b$, the triple-tree; $c$, the equalizer; $d$, a diagonal rigid fulcrum-bar for equalizer $c$, and $h$ a track which controls the distance of motion of the equalizer $c$, the triple-tree $b$ being attached to the pole $a$ by a bolt, $i$, upon which it is free to turn, the equalizer $c$ to the triple-tree $b$ by a similar joint, $l$, and the diagonal fulcrum $d$ by joints to both the pole $a$ and the equalizer $c$.

The horses being attached to my improved equalizer, the one at $g$ pulls with twice the leverage of the one at $e$, and the one at $f$, by means of the diagonal fulcrum $d$, evener $c$, and joint $i$, equalizes the uneven strain applied at $g$ against $e$.

Having thus described my invention, I will now proceed to disclaim being the first inventor of a three-horse equalizer, and claim the following as my invention and what I desire to secure by Letters Patent:

In a three-horse equalizing draft device, the triple-tree $b$ and evener or equalizer $c$, provided with the customary whiffletrees $e f g$, in combination with a diagonal fulcrum, $d$, provided with swiveling connections to the evener $c$ and the pole $a$, the whole designed to form a part of and be movable with the pole $a$ for the convenience of transportation and the saving of space.

In testimony whereof I have hereunto set my hand this 24th day of September, 1880.

WILLIAM BAYLEY.

Witnesses:
 HENRY MILLWARD.
 CHAS. L. BOGLE.